June 21, 1966 R. E. COSTA ETAL 3,256,904
PROCESSING VESSEL MEANS
Filed Jan. 8, 1964
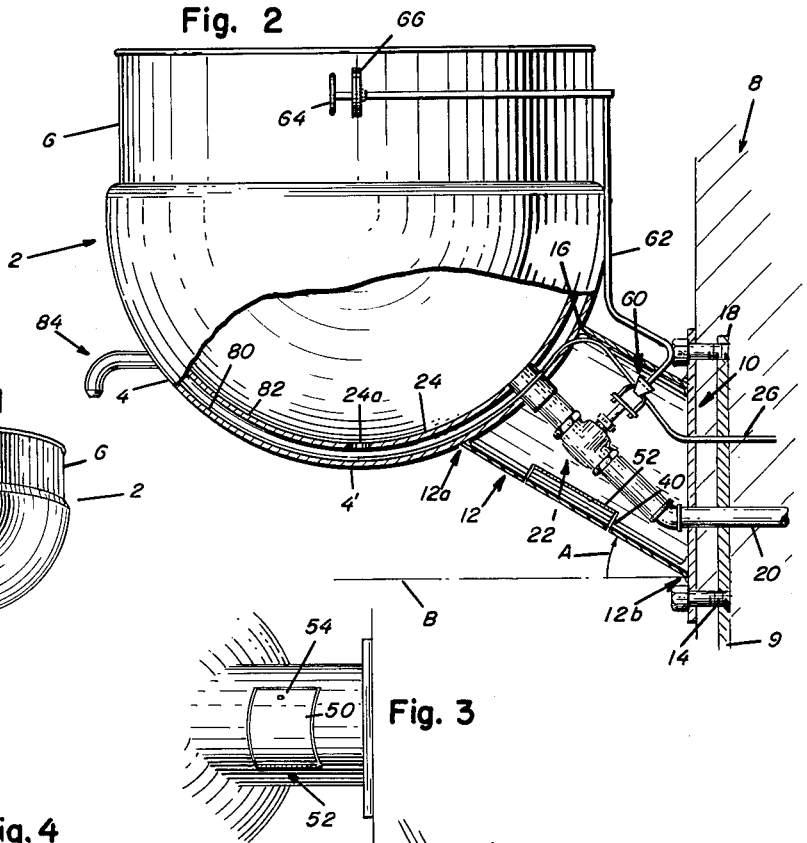
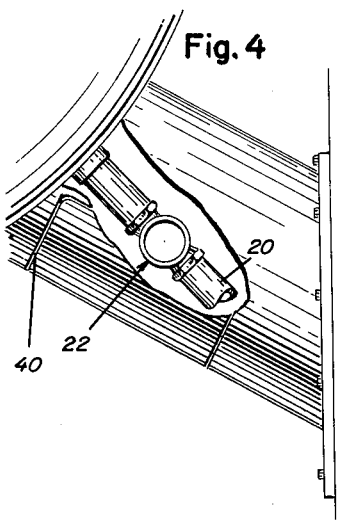
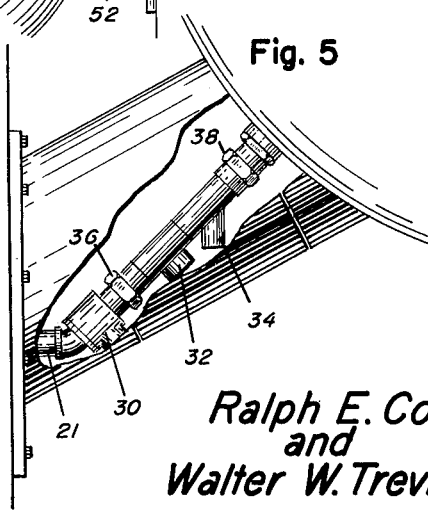
Ralph E. Costa
and
Walter W. Trevillian
INVENTORS
BY Jacobi E. Davidson
ATTORNEYS United States Patent Office 3,256,904
Patented June 21, 1966

3,256,904
PROCESSING VESSEL MEANS
Ralph E. Costa and Walter W. Trevillian, Baltimore, Md., assignors to B. H. Hubbert & Son, Inc., a corporation of Maryland
Filed Jan. 8, 1964, Ser. No. 336,586
5 Claims. (Cl. 137—376)

This invention relates generally to processing vessels, and is particularly concerned with processing vessel support arrangements.

Processing vessels are put to various commercial uses and commonly find widespread application in handling foods, and like items, where sanitary conditions are essential. In the use of such vessels, conduits and associated components including, for example, steam conduits valves, condensate conduits, and the like, are associated with the vessel, and moreover the vessel is supported at a convenient height. Conventionally, wall mounting brackets, pedestals, or frames, are associated with the vessel to properly support the same at the desired elevation. Specifically, for the support, tubular legs have been used, vertical pedestals have been used, and wall brackets have been used. In such instances, the conduits and valves associated with the vessel are exposed, and require chrome-plating or special construction to maintain sanitary conditions. On the other hand, steel frames have been used, and in this instance the conduits and valves can be hidden from external view by suitable sheet metal covering on the frame. Still with this type arrangement, the space requirements for the frame are rendered a maximum, and the area under the vessel supported by the frame becomes an obstacle.

The preceding paragraph is not presented as an exhaustive description of all prior techniques which have been used in the support of processing vessels employed in sanitary environments, but instead is included to illustrate the need for a simply supported processing vessel (a) which can be utilized in a sanitary environment and (b) which presents only the bear minimum requirements for chrome-plating, space, and the like, while still yielding an attractive appearance. Bearing this need in mind, the primary object of the present invention is to provide processing vessel means which satisfy such need.

More particularly, it is an object of the present invention to provide a processing vessel means incorporating a processing vessel and a relatively small and attractive means for supporting the processing vessel which supporting means can be conveniently attached to a vertical wall, or the like, which supporting means is adapted to enclose operating connections, such as, conduits, valves, and the like, and which supporting means maintains the vessel fixed at a proper elevation while giving complete freedom from obstacles under the vessel and to the sides of the vessel.

Consistent with the preceding objects, there are certain further important, yet more detailed, objects hereof, including: (a) the provision of such a processing vessel and supporting means therefor which completely eliminates the need for legs, support braces, exposed piping, and the like, thereby facilitating maintenance of sterile conditions; (b) the provision of such a support means which takes the form of a support plate and an outwardly and upwardly extending support column, so constructed and arranged to support the vessel at given elevation when the support plate is fixed to a wall, and yet so constructed and arranged as to present a minimum of external surfaces requiring cleaning; (c) the provision of such a support means which in over-all dimension is considerably smaller than the vessel supported thereby and yet which houses required conduits, valves, steam traps, strainers, and the like, as required; (d) the provision of such a support means which presents a uniform external appearance, but which has therein an access panel or door permitting an operator access to the interior of the support column so as to repair, adjust, or exchange operating components disposed therein; (e) the provision of such a processing vessel and support means therefor which includes means carried on the vessel for remotely controlling valve means disposed within the support column of the support means, and yet which otherwise hides or encloses the operating components; and (f) the provision of such a processing vessel and support means which can be constructed from available materials and with comparative ease so as to be commercially available at a minimum cost for widespread use.

In essence, the invention provides a processing vessel and a support therefor which gives a neater appearance, which facilitates cleaning operations, which yields a more functional installation than those previously achieved and which, accordingly, is readily adapted for use in the most stringent of sanitary environments.

The invention resides in the combination, arrangement, disposition and/or form of various components, assemblies and sub-assemblies, and will be more fully understood after reading following detailed description. Such description refers to the annexed drawings presenting preferred and illustrative embodiments of the invention. In the drawings:

FIGURE 1 is a side elevational view of a pressure vessel means constructed in accordance herewith;

FIGURE 2 is a side view, partially broken away, partially in section and on a larger scale than in FIGURE 1, of the pressure vessel means of FIGURE 1, showing the same as supported on a vertical surface;

FIGURE 3 is a fragmental detailed bottom view of the pressure vessel means shown in FIGURE 1;

FIGURE 4 is a fragmental side view, partially broken away, of the support of the pressure vessel means of FIGURE 1;

FIGURE 5 is also a fragmental side view, partially broken away, but of the opposite side of the support means shown in FIGURE 3.

Referring first to FIGURE 1, it will be noted that the vessel shown therein is generally designated by the numeral 2. This vessel has a spherical base portion 4 and a generally cylindrical upper portion 6.

The vessel 2, as shown, in FIGURE 2, is supported on a vertical surface 8 by a support plate 10 and a hollow support column 12. The plate 10 is itself fixed to the vertical surface 8 by means of bolts 14 passing through a series of suitable apertures 11 (FIGURE 1) disposed about the outer portions of the plate 10 in surrounding relation to the junction thereof with the lower end of the hollow tubular support column 12.

The particular manner in which the support plate 10 is fixed to the vertical surface or wall will vary depending on the construction of the wall. By way of example, such wall can have metal reinforcing plate such as the plate 9 shown in FIGURE 2, embedded therein, and in such instance, the bolts 14 can well cooperate with such plate threadably engaging suitable threaded apertures therein. Alternatively, and again by way of example, toggle bolts can be used with certain installations.

In any event, the hollow tubular support column 12 is fixed at its upper end 12a to the spherical base portion 4 of the vessel 2 whereas the opposite or lower end 12b of the tubular support column 12 is fixed to the support plate 10. The fixed relation between the respective components is preferably achieved by welding, i.e., the upper end 12a of the support column 12 is welded as at 16 (FIGURE 2) to the spherical base portion 4, and the lower end 12b of the tubular support column 12 is welded as at 18 to the support plate 10. The welds 16 and 18 preferably extend respectively entirely about the junctions (a) between the support column 12 and the vessel and (b) between the support column 12 and the support plate. In this manner, an adequate joint between the components is formed for the desired and required support, so that the vessel cannot only withstand the normal static loads which it will experience, but also the temporary or instantaneous dynamic loads which might be encountered thereby.

It is to be noted that the support column 12 extends outwardly and upwardly from the plate 10 at an acute angle (A) (FIGURE 2) with respect to the plane of the plate 12—i.e., with respect to the vertical plane. It is to be further noted that the vessel 2 is fixed to the support column 12 above the lower extremity of the vessel, and with the bottom extremity of the vessel disposed above the lower extremity of the junction between the support column 12 and the plate 10. Specifically, the lower extremity 4' of the vessel is disposed above the line B—the line B extending from the lower extremity of the junction between the support column 12 and the plate.

In the use of a processing vessel, such as the processing vessel 2 of FIGURE 1, it is common to supply steam thereto. Thus, a suitable conduit 20 leads from a steam supply (not shown) and communicates with the interior of the processing vessel in conventional manner. In the simplest arrangement, as shown in FIGURE 1, at least one inlet control valve 22 would be incorporated in the line 20 leading from the steam supply to the vessel 2. Even further, and in the simplest type of arrangement, the vessel 2 would include a syphon tube, such as the syphon tube 24 for condensate. The tube is open at its lower end 24a to receive condensate therein and the condensate is fed off through a suitable line or conduit 26. Syphon tubes of this type for condensate are well known, and as also well known, they operate on pressure differentials caused by presence or absence of the condensate.

In addition to the above, a conventional assembly would include a steam outlet line 21 which essentially extends parallel to the steam inlet line 20, but the steam outlet line, for example, as shown in FIGURE 5, would include a check valve 30, a steam trap 32, and a strainer 34, the parts being coupled in the line 21 by suitable conventional unions 36 and 38. It will be understood that FIGURE 5 presents but one side of the support column 12 broken away. The opposite side of the support column, when broken away, would appear as shown in FIGURE 4. From this figure, it will be noted that the inlet steam control valve 22 is coupled in the line 20, which as indicated above, and as shown by the relationship between FIGURES 4 and 5, extends parallel to the line 21.

The particular operating components disposed in the tubular support column 12 can be varied depending on the particular use and the particular processing operation being performed. Still, the significant point to note is that operating components, including at least one valve in any instance, are enclosed within the support column 12 and, as shown in FIGURE 2, lead through the support plate 10. Thus, in any arrangement, conduit means extend through the support column and the support plate and communicate interiorly with the vessel, such conduit means being entirely hidden by the support column in normal operation.

By virtue of the necessity of providing operating components, such as described immediately above, there naturally arises a need to adjust such components, and/or to replace such components. To this end, the support column 12 has a downwardly facing opening 40 therein. The opening 40 is disposed in underlying relation to the operating components, e.g., the valve 22, the valve 30, the steam trap 32 and the strainer 34, so as to provide access to such components from the underside of the support column 12.

Notwithstanding the necessary access, it is essential that the components be enclosed in accordance with the invention so as to minimize the cleaning requirements and so as to yield an attractive appearance. Accordingly, the invention contemplates providing a closure door, such as the closure door 50 (FIGURES 1 and 2), for the opening 40. The door conforms with the contour of the support column, i.e., it is cylindrical in shape, as shown, so as to make the support column have a uniform appearance throughout its length.

In this regard, it should be noted that the support column 12 shown in the drawings is preferably of cylindrical contour. This shape has been found to provide the proper mechanical support for the vessels. Still, within the scope of the invention, the shape of the support column can be varied so that the same becomes, for example, rectangular, elliptical, or the like. In any event, the door 50 would conform with the overall contour of the support column so as to give a uniform appearance thereto. The door panel 50 can be supported in position by various means, but preferably a hinge 52 is disposed along one lateral edge thereof, such hinge being of the conventional type and being secured in a conventional way, as by welding, between the side of opening 40 in the support column and the door 50. The opposite side of the door 50 would carry a suitable latch 54 as shown in FIGURE 2, so as to maintain the same in closed position.

With the arrangement shown and described above, all of the basic operating components are hidden from view and the plate 10 and the support column 12 adequately provide support for the vessel whereby when the plate is fixed to a vertical surface, such as the surface 8, the vessel 2 is maintained in position upwardly and outwardly of the plate 10 with the conduits leading to the vessel hidden from view by the column 12.

If desired, the valve 22 can have a conventional mechanical operating linkage such as the linkage 60 (FIGURE 2) associated therewith. In this instance, a control cable 62 would lead from the linkage 60 upwardly of the vessel and, for example, to a hand wheel 64. Rotation of the hand wheel 64 controls the cable 62 and in turn the linkage 60, so as to selectively open and close the valve 22 from a convenient level and without requiring the user or operator to open the access panel or door 50. Still, even though this one control element is exposed, the basic operating components are hidden from view by the support column, so that maintenance problems and cleaning problems are minimized.

In the latter regard, it is to be noted that the transverse dimension of the support column 12 is smaller than the transverse dimension of the support plate 10, and that the maximum dimensions of the support plate and of the support column are but a minor fractional part of the maximum dimensions of the vessel 2. By virtue of such relationship, the exposed support surfaces are at a minimum, and one need basically merely clean the vessel proper, devoting very little time to the cleaning of the support column and the support plate by virtue of the minimal size thereof.

In addition to minimizing the cleaning problems, the pressure vessel means and support arrangement described above and provided hereby present no obstacle under the vessel or to the sides of the vessel. Instead, only the very minor space required for the support column and the plate are utilized adjacent the vessel proper, and the areas to the sides thereof are free of brackets and the areas thereunder are free of legs, bulky frames, or the like.

Although very little discussion has been presented above with respect to the processing vessel 2, it should be apparent from FIGURE 1 that the same is of conventional type including the double walls 80 and 82 and an outlet 84. Processing vessels or kettles of such type are well known in the industry and, in fact, have been previously described in some detail in various publications including Folder No. A-26, B. H. Hubbert & Son, Inc., of Baltimore, Maryland, under a date of March 1963 and with a title of "Wall-Mounted Steam-Jacketed Kettles by Hubbert."

The materials used in the pressure vessel means construction hereof can be varied, but the materials should always possess sufficient strength to afford the desired support. To this end, the support column 12 is preferably formed of an 18-8 stainless steel tube, and the plate 10 and bolts 14 are preferably formed of stainless steel. If an embedded plate is used in the wall on which the assembly is supported, such plate preferably is made of carbon steel.

The conduits which cooperate with the vessel as prescribed above, can also provide some support for the vessel, but whether support is provided by the conduits or not, the support plate and support column provide the predominant support and in any event, external brackets, posts, legs, or the like, are not required. As indicated above, the cylindrically shaped support column provides the best support mechanically and particularly so when used with a vessel having a spherical bottom portion. Still, the shape of the vessel can be varied without departing from the invention.

Having now described the invention in considerable detail, it should be apparent that the objects set forth at the outset of the present specification have been successfully achieved. Accordingly,

What is claimed is:

1. Vessel means adapted to be fixed to a vertical surface, said vessel means comprising:
   (a) a vessel with a spherical base portion;
   (b) a support plate adapted to be fixed to a vertical surface;
   (c) a hollow tubular support column fixed at end to said spherical base of said vessel and fixed at its opposite end to said support plate,
      (1) said support column extending outwardly and upwardly from said plate at an acute angle with respect to the plane of said plate,
      (2) said vessel being fixed to said support column above the lower extremity of the vessel and with the bottom extremity of said vessel above the lower extremity of the junction between said support column and said plate,
      (3) said support column having a downwardly facing opening therein,
      (4) said support column including a closure door for said opening, said door conforming with the contour of said support to make the same have a uniform appearance throughout its length,
   (d) conduit means extending through said support column and said support plate and communicating interiorly with said vessel, said conduit means being entirely hidden by said support column when said closure door closes said opening;
whereby when said plate is fixed to a vertical surface, said support column supports said vessel upwardly and outwardly of said plate with the conduits leading to said vessel hidden from view.

2. Vessel means as defined in claim 1, wherein said hollow tubular support column is cylindrical and wherein said conduit means extending through said support column and said support plate includes an inlet conduit means and an outlet conduit means.

3. Vessel means as defined in claim 2, wherein said inlet conduit means includes an inlet control valve disposed in said tubular support column in overlying relation to said door, and wherein said outlet conduit means includes a check valve, a steam trap and a strainer disposed in said tubular support column, in overlying relation to said door.

4. Vessel means as defined in claim 1, wherein said conduit means includes a control valve disposed in said tubular support column, and wherein said vessel means includes a control cable extending from said control valve and exteriorly of said tubular support column, and operating means for said control cable, said operating means being fixed on said vessel.

5. Vessel means adapted to be fixed to a vertical surface, said vessel means comprising:
   (a) a vessel with an arcuate base portion;
   (b) a support plate adapted to be fixed to a vertical surface;
   (c) a hollow tubular support column fixed at end to said arcuate base portion of said vessel and fixed at its opposite end to said support plate,
      (1) said support column extending outwardly and upwardly from said plate at an acute angle with respect to the plane of said plate,
      (2) said vessel being fixed to said support column above the lower extremity of the vessel and with the bottom extremity of said vessel above the lower extremity of the junction between said support column and said plate,
      (3) said support column having an opening therein and a closure for the opening, and
   (d) conduit means extending through said support column and said support plate and communicating interiorly with said vessel, said conduit means being entirely hidden by said support column when said closure closes said opening;
whereby when said plate is fixed to a vertical surface, said support column supports said vessel upwardly and outwardly of said plate with the conduits leading to said vessel hidden from view.

References Cited by the Examiner

UNITED STATES PATENTS

| | | | |
|---|---|---|---|
| 1,101,749 | 6/1914 | Madden | 137—376 X |
| 1,102,123 | 6/1914 | Asztalos | 137—376 X |
| 1,947,515 | 2/1934 | Blackburn | 137—376 X |
| 1,957,831 | 5/1934 | Hague et al. | 4—252 |
| 2,411,006 | 11/1946 | Sharp | 126—378 |
| 2,693,881 | 11/1954 | Chambers et al. | 248—200 X |

M. CARY NELSON, *Primary Examiner.*

H. KLINKSIEK, *Assistant Examiner.*